US009237410B1

(12) United States Patent  
Georghiou

(10) Patent No.: US 9,237,410 B1  
(45) Date of Patent: Jan. 12, 2016

(54) SHARING MOBILE DEVICE CONTENT IN A MANY-TO-ONE MANNER

(71) Applicant: MEDIASPARK INCORPORATED, Sydney (CA)

(72) Inventor: Mathew Georghiou, Sydney (CA)

(73) Assignee: MEDIASPARK INCORPORATED, Sydney (CA)

( * ) Notice: Subject to any disclaimer, the term of this patent is extended or adjusted under 35 U.S.C. 154(b) by 0 days.

(21) Appl. No.: 14/458,215

(22) Filed: Aug. 12, 2014

Related U.S. Application Data

(60) Provisional application No. 61/866,417, filed on Aug. 15, 2013.

(51) Int. Cl.
  *H04W 4/00* (2009.01)
  *H04W 4/12* (2009.01)

(52) U.S. Cl.
  CPC ............... *H04W 4/005* (2013.01); *H04W 4/12* (2013.01)

(58) Field of Classification Search
  USPC ........................................................ 455/418
  See application file for complete search history.

(56) References Cited

U.S. PATENT DOCUMENTS

| 7,778,973 | B2 | 8/2010 | Choi et al. ................... 707/628 |
| 2005/0165719 | A1* | 7/2005 | Greenspan et al. ............... 707/1 |
| 2006/0195521 | A1 | 8/2006 | New et al. ..................... 709/204 |
| 2007/0232342 | A1* | 10/2007 | Larocca ........................ 455/518 |
| 2009/0034463 | A1 | 2/2009 | Rao ................................ 370/329 |
| 2013/0109426 | A1* | 5/2013 | Kerger et al. ................. 455/518 |

* cited by examiner

*Primary Examiner* — Kabir A Timory  
(74) *Attorney, Agent, or Firm* — Pillsbury Winthrop Shaw Pittman LLP

(57) ABSTRACT

Systems and methods for sharing information between media devices of members of user groups in a many-to-one manner are presented herein. User groups may include group manager type users as managers of the user groups and group member type users as members of the user groups. Information may be shared between group members and group managers of associated user groups. The group managers receive aggregate information comprising information captured from the media devices of the members of the associated user group for display on the media devices used by the group managers.

27 Claims, 6 Drawing Sheets

SHARING MOBILE DEVICE CONTENT IN A MANY-TO-ONE MANNER

FIELD OF THE DISCLOSURE

This disclosure relates to systems and methods for communicating information between media devices, and, more specifically, communicating information such that information is shared in a many-to-one manner within user groups comprising multiple media devices.

BACKGROUND

In today's technological age, consumers are able to store all types of information on their media devices (e.g., computing platforms such as PDAs, cellular telephones, smart phones, gaming consoles, laptops, tablets, desktop computers, PCs, etc. . . . ). Some users may share information which is stored and/or displayed on their media devices with other users of media devices. Communication channels used for sharing information include wired and/or wireless communications. Wireless communications may be facilitated over a network such as the Internet, cellular networks, near field communication, Bluetooth, and/or other wireless communication channels. For example, digital information may be shared via short message services (e.g., text and/or picture messages), electronic mail (e.g., email), and/or by other techniques. Wired communications may be facilitated by universal serial bus (USB) enabled wired communications, and/or other considerations.

SUMMARY

One aspect of the disclosure relates to a system for processing and/or organizing information communicated between media devices (also referred to as user devices). In particular, one or more aspects of the disclosure describe techniques that facilitate sharing information in a many-to-one manner. For example, users associated with user devices may be organized into user groups. Individual ones of the user groups may include a group manager associated with a user device and multiple group members that are individually associated with user devices. A group manager of a given user group may obtain, store, organize, and/or view information that is sent, retrieved, captured, collected, and/or otherwise obtained from the user devices associated with the group members.

One or more techniques describe herein provide a solution to problems associated with known techniques for sharing information in a many-to-one manner. As an illustrative example, using known email, text messaging, and/or other techniques, an employer wishing to receive information from many employees must 1) obtain contact information for each of the employees, 2) communicate to the employees that they wish to collect information, 3) wait for responses from the employees, and 4) once the responses are received, diligently maintain the responses in an organized manner. Organization may be quite complex since email, text messaging, and other techniques may include a general "inbox" which merely shows the temporal order in which information is received. For example, the employees may send responses that include extraneous information such that the receiving employer must then labor through each individual response to obtain only the desired information. Thus, organization through known techniques may be time consuming and undesirable in many situations. These and additional problems may be alleviated through employment of one or more implementations of the system presented herein.

In accordance with one or more implementations of the system configured for processing and organizing information communicated between media devices, a host server of the system may comprise one or more processors configured to execute one or more computer program components. The computer program components may comprise one or more of a grouping component, a settings component, an implementation component, and/or other components.

The grouping component may be configured to associate the users of the system with individual user groups. The associations may include associating group manager type users as managers of the individual user groups. The associations may include associating group member type users as members of the individual user groups. As an illustrative example, the user groups may include a first group and/or a second group. The first group may include a first group manager, a first member, a second member, and/or other members associated therewith.

The settings component may be configured to obtain information settings selected by group managers. The information settings may correspond to information that is to be obtained from user devices of members of a user group and communicated to the user device of the associated group manager. The information settings may be obtained from the user devices associated with the group managers. The group managers may select the information settings through entry and/or selection at the associated user device.

Information settings may correspond to one or more of a type of information which is shared, the size of information data files which are shared, the time/date at which information is shared, and/or other information. Types of information may include one or more of user device information, images, text, user identification information, and/or other considerations. As an illustrative example, the settings component may be configured to receive first information settings for the first group. The first information setting may be based on one or more selections by the first group manager of the first group.

The implementation component may be configured to implement the obtained information settings for the individual groups. Implementing the information settings may include effectuating a capture of information at the user devices associated with the members of a group. The implementation component may receive the captured information. The implementation component may be configured such that implementing the obtained information settings comprises communicating information to the user devices associated with the group managers. The information which is communicated to the group managers may include all, or a subset of, the captured information, and/or other information. For example, the implementation component may be configured to receive a first information set. The first information set may include information captured at a first user device associated with the first member and/or information captured at a second user device associated with the second member. The first information set may include information that is captured in accordance with the first information settings and/or may include other information. The implementation component may be configured to transmit the first information set, or a subset of the first information set, to a third user device associated with the first group manager.

Another aspect of the invention relates to a system for communicating information between user devices, such as between a user device associated with a group manager and user devices associated with group members. The user devices associated with group managers may include one or more processors configured to execute computer program components. The computer program components executed by the user devices of the group managers may comprise one or more of an input component, a transmission component, a reception component, a display component, and/or other components.

The input component may be configured to obtain information settings input by a group manager associated with a given user device. The information settings may be obtained, at least in part, on entry and/or selection of settings by the associated group manager. The information settings may correspond to information which is to be received by the group manager from user devices of the members of a user group. The input component may be configured to communicate the information settings input by the group managers to the server. For example, the input component may obtain the first information settings from the first group manager of the first group by virtue of entry and/or selection by the first group manager at the third user device.

The transmission component may be configured to effectuate transmission of a message to the user devices associated with the members of an individual user group, either directly or indirectly. The message may direct the members to capture and/or send information to the group manager (e.g., to the user device associated with the group manager). For example, the transmission component may be configured to effectuate transmission, either directly or indirectly, to the first user device, the second user device, and/or other user devices, of a first message directing the first member, second member, and/or other members to capture and/or send information to the first group manager.

The reception component may be configured to receive information corresponding to information captured at the user devices of the members of a user group. In some implementations, the information may be received in response to the members' positive response to the message associated with the transmission component. In some implementations, the information may be received automatically (e.g., with or without direct member response). The information received may be in accordance to the information settings and/or may include other information. The information which is received may be the information that is captured at the user device of the members, a subset of the information that is captured at the user devices of the members, and/or other information. For example, the reception component may be configured to receive the first information set. The first information set may include information captured at the first user device, information captured at the second user device, and/or other information. The received first information set may include information in accordance with the first information settings and/or other information.

The display component may be configured to display the information received by the reception component on the user device. For example, the display component may be configured to display the first information set received by the reception component on the third user device associated with the first group manager.

Another aspect of the invention relates to a system for communicating information between user devices, such as between user devices of a group member and a user device of a group manager. The user devices associated with the group members may include one or more processors configured to execute computer program components. The computer program components may comprise one or more of a messaging component, a capture component, and/or other components.

The messaging component may be configured to receive messages which are sent from user devices of group managers. The message may be messages directing the group members to capture and/or send information to the group manager of the user group associated therewith as presented herein. The messages may be received directly from the user devices of the group managers (e.g., SMS message, and/or other direct communications), indirectly from the user devices of the group managers (e.g., routed through the server, and/or via other indirect communications), and/or other considerations. For example, the messaging component executing on the first user device associated with the first user may receive the first message associated with the first group manager of the first group. The first message may direct the first member to capture and/or send information at the first user device to the third user device.

The capture component may be configured to, responsive to the member positively responding to the message received by the messaging component, capture information from the user device of the member. The captured information may correspond to the selections of the information settings by the group manager, either exclusively or non-exclusively. The capture component may be configured to, responsive to capturing the information, send the information to the server. For example, responsive to the first member and/or the second member positively responding to the first message, the capture component may be configured to capture information from the first user device associated with the first member. Responsive to capturing the information, the capture component may be configured to effectuate communication of the captured information to the server. The information captured at the first user device may comprise the first information set, a subset of the first information set, and/or may comprise other information. The information captured at the second user device may comprise the first information set, a subset of the first information set, and/or may comprise other information.

Another aspect of the invention relates to a method for processing information communicated between user devices. The method may comprise the steps of associating users with user groups, obtaining information settings for the individual user groups, receiving information captured on user devices of members of the user group, transmitting information to user devices of managers of the user group, and/or other operations.

The associations of users with user groups may include associating group manager type users as managers of the individual user groups and group members type users as members of the individual user groups.

Information settings for individual user groups may be related to the information that is to be shared between users in the group. The information settings for the individual groups may correspond to entry and/or selections by the group managers at their associated user devices.

Information which is captured on user devices of a member may be received. The received information, or a subset of the received information, may thereafter be transmitted to a user device of the group managers associated with the user group. Information which is received may be exclusive or non-exclusive to the information settings. The information which is transmitted may be exclusive to the information settings based on the implementation of the information settings.

Another aspect of the invention relates to a method for communicating information between a user device of a group manager and user devices of members of a user group managed by the group manager. The method may comprise the steps of obtaining information setting input by the group manager, transmitting a message to the group members, receiving information including information captured at the user devices of the group members, displaying the received information, and/or other operations.

Obtaining the information settings from the group manager may include the group manager inputting selections of information settings on their user device.

The message transmitted to the group members may direct the members to capture and/or send information to the group manager.

Responsive to the members positively responding to the message (e.g., capturing the information at the respective user device), the user devices of the group managers may receive (e.g., directly or indirectly) the captured information, and/or a subset of the captured information, from the members of the user group. The information received may be in accordance to the information settings and/or may include other information.

The information received by the user device of the group manager may be displayed for viewing by the group manager.

Another aspect of the invention relates to a method for communicating information between a user device associate with a group member and a user device associated with a group manager of a user group. The method may include the steps of receiving messages from the group managers (directly or indirectly), capturing information on the user device, sending the captured information to a remote (or local) server, and/or other operations.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION

Figure 1:
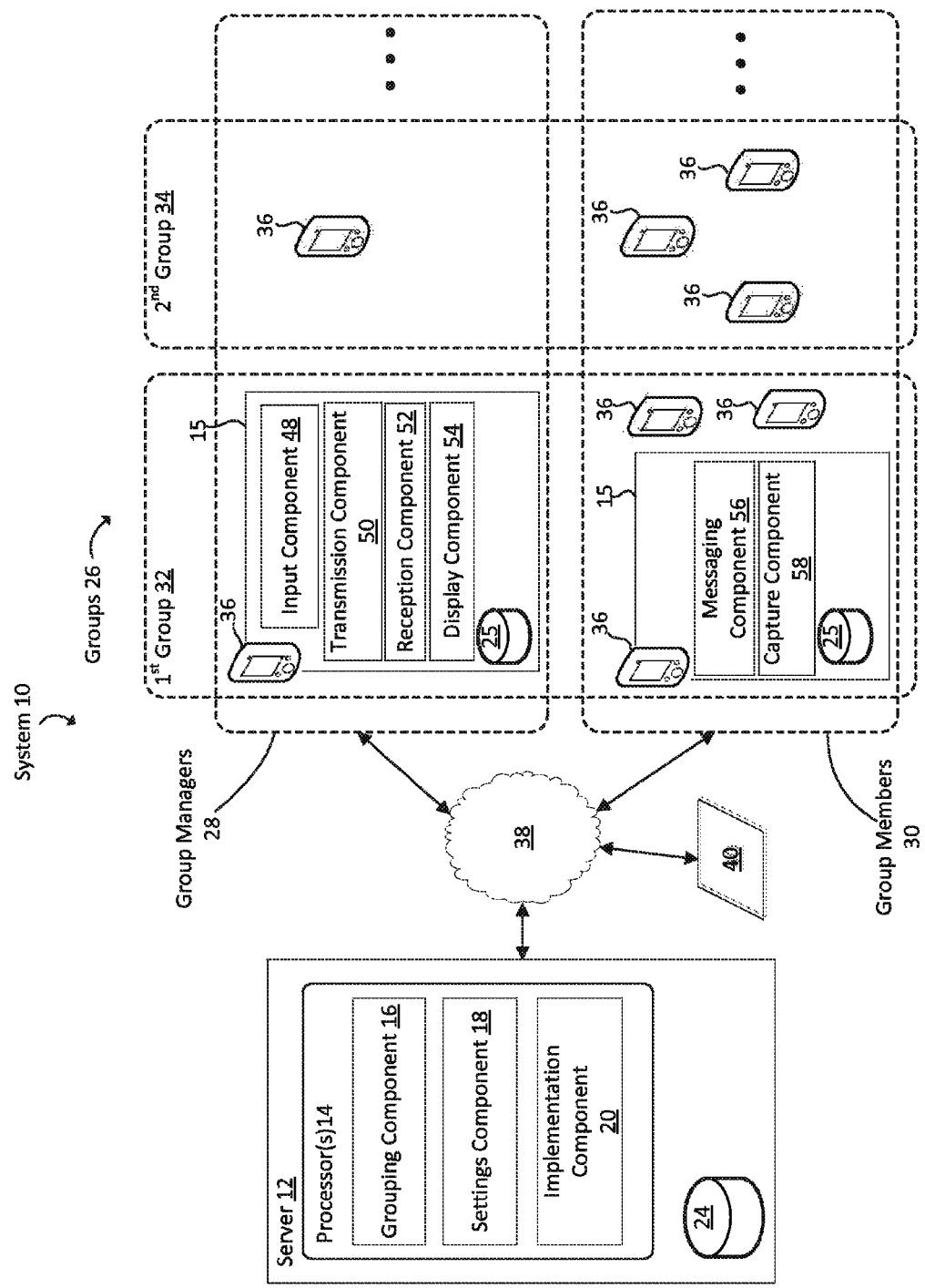
FIG. 1 illustrates a system for processing and/or organizing information which is shared between user devices in a many-to-one manner, wherein the user devices are associated with either group managers of user groups or group members of the user groups, and wherein sharing of information is accomplished, at least in part, via communications directed to and/or from a server.

FIG. 1 illustrates a system 10 configured to communicate information between users of media devices in a many-to-one manner. Media devices, herein also referred to as "user devices" 36, may include, for example, devices which are capable of network communication and/or other devices. User devices 36 may include mobile electronic devices such as PDAs, cellular telephones, client devices, smart phones, laptops, tablets, smart watches, wearable computers, wearable computing devices/platforms, and/or other devices. User devices 36 may include desktop devices such as desktop computers, PCs, and/or other devices.

The system 10 herein allows users of media devices to share and/or communicate information to other user of user devices 36. A collection of users who share information may be referred to as a user group 26. For example, a first user group 32, a second user group 34, and/or other user groups may comprise collections of users who share information. Herein, the terms 'share' may refer to any technique for communicating and/or transmitting information between network enabled devices either directly or indirectly. For example, information may be shared directly between user devices, and/or indirectly through communications routed to and from an intermediate user device, one or more servers, cloud computing networks, and/or other considerations.

In some implementations, the user groups 26 may include group manager type users as managers 28 of individual user groups and group member type users as members 30 of individual user groups 26. In some implementations, individual user groups 26 may comprise at least one group manager 28 and at least one group member 30. In some implementations, individual user groups 26 may comprise one group manager 28 and two or more group members 30. User groups 26 may be assigned group numbers, group names, and/or other identification information which can be used for correlating the user groups 26 with the particular group managers 28 and/or group members 30 associated with an individual user group 26.

Many-to-one sharing may comprise multiple members 30 of the user groups 26 sharing information from user devices 36 of the members 30 to user devices 36 of the group managers 28, either directly or indirectly. Group managers 28 may receive information from some or all members 30 of the user groups 26, either directly or indirectly. Group managers 28 may receive information from members 30 in an aggregate manner which may allow the managers 28 to track, monitor, organize, and/or review the aggregate information communicated from the members 30 (see, e.g., FIG. 7).

In some implementations, sharing may be also be accomplished via "offline", and/or direct communication techniques. For example, offline communications may include near field communications (NFC), Bluetooth®, wired connection, and/or other techniques which may not require communication over an internet network. Sharing of data offline may be used to provide additional security for users that prefer not to have information pass through a server hosted over a network, such as the Internet.

In some implementations, the system 10 may include an application programming interface (API) to allow third-party developers to integrate the features and/or components of the system 10 into other software and/or applications.

The information which is shared within the user groups 26 may be subject to one or more information settings. The information settings may restrict, limit, and/or otherwise define the information which the managers 28 receive (e.g., directly or indirectly) from the members 30. Information settings may be customized and/or selected by the group managers 28. Information which is shared may include information which corresponds exclusively to the information settings selected by the group managers 28 (e.g., exclusive information that is dependent on the information settings). Information which is shared may be information which is non-exclusive information and includes all or a substantial amount of the information which is capable of being shared within the system 10 (e.g., non-exclusive information that is independent of the information settings). The information which is received by and displayed on the user devices of the group managers 28 may be different than the information which is captured at the user devices 36 of the group members 30 (e.g., non-exclusive information may be captured and then filtered, wherein only the filtered information is received, and viewable by the managers).

The system 10 herein may facilitate selections of information settings by the group manager 28 by effectuating presentation of a user interface on the user devices 36 associated with the group managers 28. The user interface may be configured to receive entry and/or selection by the group managers 28 for making such selections (e.g., through conventional input techniques such as a keyboard, touchscreen, and/or other technique). The user interface may be in the form of an application program which can be downloaded and/or loaded onto the user devices 36 of the group managers 28. The user interface may be presented in other forms (e.g., a webpage accessible via a network, such as the Internet and/or other considerations).

Information settings may correspond to manager selections of one or more of the type of information which is to be captured at the user devices of the members 30 and/or shared, the size of information data files which are captured and/or shared, the time/date at which information may be captured and/or shared, and/or other information. Types of information may include one or more of user device information, images, text, user identification information, and/or other information.

User device information may include information associated with the user devices of the members of the user groups. User device information may include one or more of global positioning system (GPS) coordinates of the user device (or other geo-location coordinates), a travel history of the user device, operating system information, user device manufacturer information, user device model information, user device IP address, user device MAC address, user device build files, installed applications (apps) on the user devices, website bookmarks, website favorites, browsing history, and/or other information.

GPS coordinates (e.g., other geo-location coordinates) relating to user devices 36 may be considered in a variety of ways. GPS coordinates may include the real time coordinates of the user devices 36 associated with the members 30 of the user groups 26. Real time coordinates may be the coordinates of the user device 36 captured at the time when information is shared between the group members 30 and the group managers 28 (directly or indirectly). GPS coordinates may include coordinates which are saved and/or stored on the user devices 36 of the group members 30 at some point in time prior to the group members 30 sharing the information with the group managers 28. GPS coordinates may be actively saved and/or stored by the members 30 associated with the user devices 36. GPS coordinates may be automatically stored and/or saved by the user devices 36. GPS coordinates may be obtained by other technique. GPS coordinates may be generated by the user devices 36 automatically (e.g., by an applicant program configured to communicate with a GPS satellite, and/or other considerations), by user input, and/or by other technique. GPS coordinates and/or other geo-location coordinates may be considered in other ways.

Sharing real-time GPS coordinates (and/or other geo-location coordinates) may be accomplished by capturing the coordinates from the user devices 36 of the members 30 at the instance the members 30 share the information. Coordinates may be captured from applications already present and enabled on the user devices 36 of the members 30 which are capable of determining such coordinates, through one or more GPS engaged features provided by the system 10, and/or by other considerations.

Operating system information may include operating system information for the user devices 36 associated with the members 30 of the user groups 26. Operating system information may include operating system developer name, type, code name, version, and/or other information associated with the operating system of the user devices 36 of the members 30 of the user groups 26. For example, operating system information may include information such as Android® 4.2.2 Jelly Bean®, iOS®, Windows®, and/or other information. Operating system information may be stored within local memory of the user devices 36 such that operating system information may be shared without active participation of the group members 30 selecting, retrieving, locating, and/or otherwise determining such operating system information from their respective device.

Device manufacturer (e.g., make) and model information may refer to information corresponding to the user devices 36 of the members 30 of the user groups 26. Manufacturer and model information may include conventional manufacturer and make information associated with user devices 36 as described herein. For example, device manufacturer and model information may include information such as MOTOROLA Droid RAZR, APPLE iPHONE 4s, and/or other information. Device manufacturer and/or model information may be information which is stored within local memory of the user devices 36 such that manufacturer and/or model information may be shared without active participation of the group members 30 selecting, retrieving, locating, and/or determining such information from their respective user device.

Device internet protocol (IP) address may refer to a numerical label assigned to the user devices 36 participating in network communication that uses the internet protocol for communication. IP address may refer to the commonly known definition. IP address may be information which is stored within local memory of the user devices 36 such that the IP address may be shared without active participation of the group members 30 selecting, retrieving, locating, and/or determining such information from their respective user device.

Devices media access control (MAC) address may refer to a unique identifier assigned to the user devices 36. MAC addresses may refer to the commonly known definition. MAC address may be information which is stored within local memory of the user devices such that the MAC address may be shared without active participation of the group members 30 selecting, retrieving, locating, and/or otherwise determining such information from their respective user device.

Device build files may refer to source code files which are run and/or executed by the user devices 36. Device build files may refer to the commonly known definition thereof. Device build files may be information which is stored in local memory of the user devices 36 such that the build files may be shared without active participation of the group members 30 selecting, retrieving, locating, and/or otherwise determining such information from their respective user device.

Sharing images between the user devices 36 may refer to images which are taken by user devices 36 having image capturing capabilities. Images may refer to images which are stored or have been stored by the user devices 36. Images may be stored in local and/or remote memory storage (e.g., cloud storage) associated with the user device 36. Images may refer to screenshots which are captured at the user devices 36 of the members 30 in real time, or near real time, during the time when information is shared (e.g., automatically taken or by virtue of user input). Images may refer to screenshots which are stored within local and/or remote memory associated with the user devices 36. Images may include metadata associated therewith. In some implementations, the images and metadata associated therewith may be shared concurrently or separately. Images may refer to images which can be annotated, edited, and/or modified. Images may refer to images which cannot be annotated, edited, and/or modified.

Sharing text between user devices 36 may refer to text which is typed and/or written using suitable device interfaces of the user devices 36 that are capable of receiving user input for forming alphanumerical or other textual strings. Text may refer to any text, world, phrase, sentence, and/or paragraph a member 30 may want to communicate and/or share with a group manager 28. Text may be shared by conventional techniques such as SMS, electronic mail, and/or other techniques internal and/or external to the system 10 (e.g., direct and/or indirect communications).

Sharing user identification information between user devices 36 may include sharing information and correlating the shared information with the recipient and/or sender of the information. User identification information may comprise one or more of a user identification number, a tag, a key, a code, a name, a nickname, a username, and/or other considerations. User identification information may be information which is associated with an individual member 30 of a given user group 26. User identification information may be information which is assigned to an individual member 30 by the system 10, by an associated group manager 28, and/or other techniques. User identification information may be information which is inherent to the user device of a given member (e.g., the device IP address).

A username may be a name which is associated with an individual member 30 of a given user group 26. A username may be a name which is assigned to the individual member 30 by the system 10, by an associated group manager 28, by other members 30, and/or other techniques. User identification information may aid the group managers 28 in organizing the aggregate information which is received from the multiple group members 30. The system 10 may facilitate the presentation of user identification information of the members 30 on the user devices 36 of the group managers 28 along with the shared information when viewing aggregated shared information for organizational purposes and/or other purposes.

In some implementations, the group members 30 may share information captured from barcodes, quick response (QR) codes, and/or other considerations. For example, the system 10 may be configured such that user devices of the group members 30 are configured with devices and/or components configured for reading barcodes, QR codes, and/or other information embedded entity. This may include, for example, a barcode reader, a QR code reader, a scanner, and/or other suitable component coupled to or incorporated with the user devices 36. Barcode reading, QR code reading, and/or other reading/canning may be facilitated through employment of a camera and/or suitable processing techniques of the user devices 36, and/or other considerations.

In FIG. 1, sharing information between group members 30 and group managers 28 may comprise relaying and/or communicating information through a host server 12 via a network 38, such as the Internet. The host server 12 may receive information and/or data sent from the members 30 and/or managers 28. The server 12 may disseminate the information to the appropriate group managers 28 and/or members 30 within corresponding user groups 26.

The host server 12 may include one or more processors 14 configured to execute one or more computer components for facilitating the sharing of information between group members 30, group managers 28, and/or users and/or components of the system 10. The computer program components may include one or more of a grouping component 16, settings component 18, implementation component 20, and/or other components. The server 12 may be configured to communicate with one or more user devices 36, according to client/server architecture. The users associated with the user devices 36 may access server 12 via the user devices 36.

User devices 36 may include one or more processors 15 configured to execute one or more computer components to facilitate communication with one or more user devices 36, to communicate with one or more remote (or local) servers, such as server 12, to present views of user interfaces configured to receive user entry and/or selection, to display information, and/or to perform more or less operations. The computer program components executed by the user devices 36 associated with the group managers 28 may include one or more of an input component 48, a transmission component 50, a reception component 52, a display component 54, and/or other components. The computer program components executed by the user devices 36 associated with the group members 30 may include one or more of a messaging component 56, a capture component 58, and/or other components.

Figure 2A:
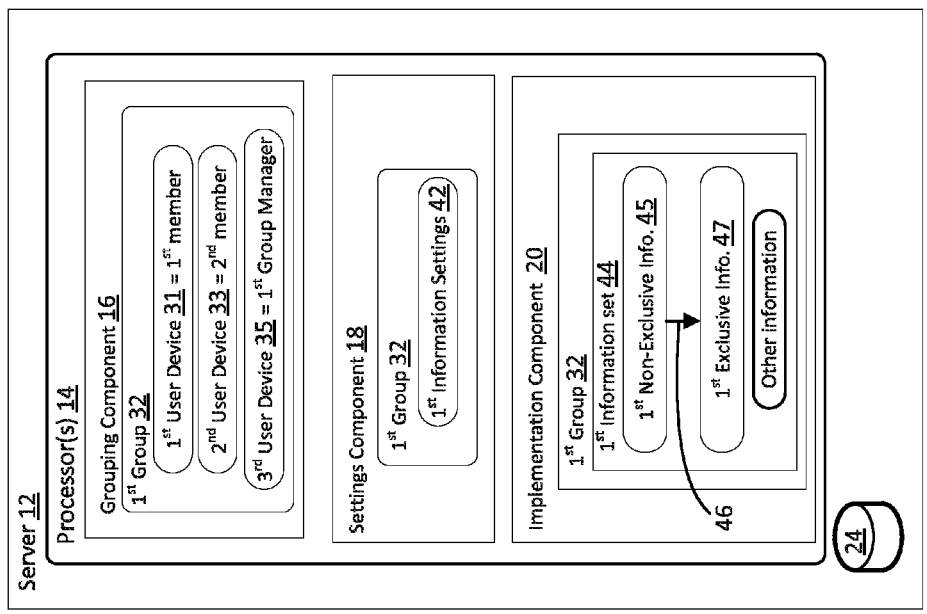
FIG. 2A illustrates an implementation of the server employed in the system of FIG. 1.
Figure 2B:
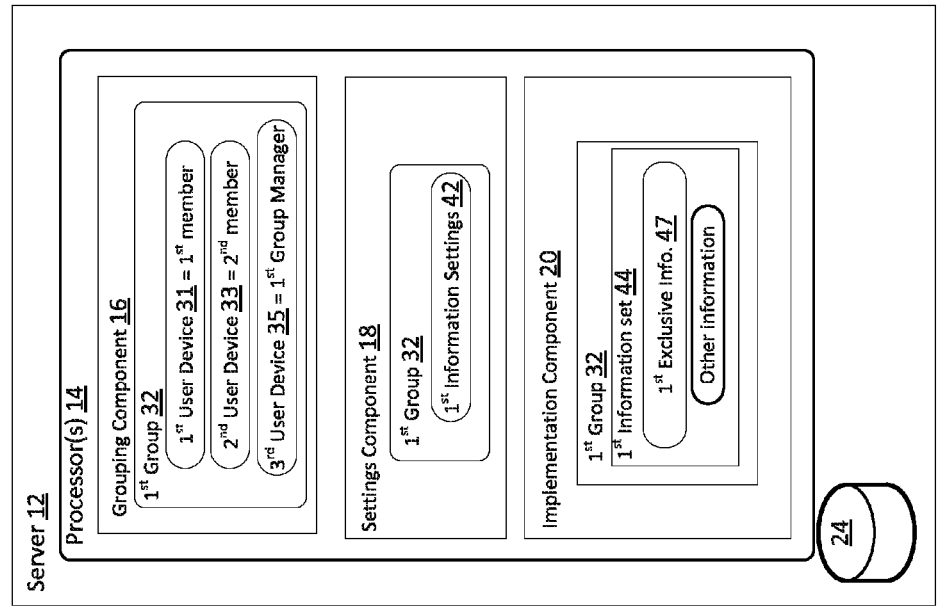
FIG. 2B illustrates an implementation of the server employed in the system of FIG. 1.

Referring now to the server 12 of FIG. 2A and FIG. 2B, the grouping component 16 may be configured to provide associations of the users of the system 10 with one or more user groups 26. Such associations may include, for example, associating group manager type users 28 as managers of the individual user groups 26 and group members type users 30 as members of the individual user groups 26. For example, the user groups 26 may include the first group 32. The first group 32 may have a first member associated with a first user device 31, a second member associated a second user device 33, and/or other members associated with other user devices 36. The first group 32 may have a first group manager associated with a third user device 35.

Referring back to FIG. 1, in some implementations, group managers 28 may access the server 12 and create and/or access an account and/or profile correlating the group managers 28 to a user group 26. Through the creation of an account and/or profile within the server 12, the group managers 28 may thereafter be designated as managers of the created individual user groups 26. Individual user groups 26 may be assigned and/or designated group identification information (e.g., group numbers, group names, and/or other considerations) prior to and/or concurrently with the creation of the user group 26. When group managers 28 create a group 26, group identification information may be generated for the groups automatically by system 10, by the group managers 28, and/or by other considerations. Group identification information may be stored in a database on the server 12 (e.g., via storage 24).

As an illustrative example, a group manager 28 associated with a user group may create a group, and name the group as desired. A group manager may be a teacher and/or other user. The group manager may name a group "First Period English Class Group", and/or may provide other group identification information during the creation of the group. In this example, without implying any limitations, the members of the group may be students of the teacher.

The grouping component 16 may be configured to associate prospective group members 30 with the individual groups 26 created by the group managers 28 through a variety of techniques. Prospective group members 30 may access the server 12 through an application program which can be downloaded and/or loaded onto the user devices 36 associated with the members 30, by accessing a web page and/or web browser through a network (e.g., the Internet), and/or access the server 12 by other techniques. Members 30 may search within the server 12 and/or select a group they wish to join using the group identification information associated with the group. For example, a manager who is creating a group may disseminate the group identification information to individuals who are to become members of the group. However prospective group members 30 may associate with individual groups 26 by other techniques and/or considerations.

As an illustrative example, following the student/teacher example described above, a teacher (e.g., group manager) may create a group and provide the students (e.g., members) the group identification information for the group (e.g., group name, number, and/or other considerations). The students may then search for and/or select the group using the group identification information within a databases stored by server 12. Responsive to the students selecting the appropriate group, the students may thereafter be associated with the group as members of the group (e.g., by the grouping component 16). Sharing of information between managers 28 and members 30 may then proceed.

In some implementations, group managers 28 may confirm that prospective members 30 can become members of the groups 26 associated with the group managers 28 for security and/or other purposes. For example, when prospective members 30 search for and/or select an individual user group 26, the managers associated with the user group 26 may be prompted (e.g., by instant message, email, and/or other technique) to confirm that the prospective member 30 can be associated as a member of the group 26. Group managers 28 may then confirm or deny an association of the prospective member 30 with the group 26.

In some implementations, a challenge-response authentication process may be prompted when a prospective member 30 selects a particular group. For example, the challenge-response authentication may include conventional authentication processes such as password entry, security question/answer, and/or other considerations.

At some point in time prior to, concurrently with, or after the group members 30 being associated with the user groups 26, the group members 30 may be assigned and/or designated user identification information (e.g. a username, number, and/or other considerations) so that information shared with the associated group manager 28 can be correlated appropriately. The user devices 36 of the group managers 28 may be configured to use the user identification information in the organization of information that is received by the group managers 28. User identification information may be assigned and/or generated for the associated members 30 automatically by the grouping component 16, by a group manager 28, by the members 30 themselves, and/or by other techniques. A username may be an alphanumeric character string and/or more than one character string. A user identification number may be a numerical string and/or more than one numerical string.

The settings component 18 may be configured to obtain information settings for the individual groups 26 entered and/or selected by the group managers 28 associated therewith. The manner in which the settings component 18 obtains the information settings from the group managers 28 may include receiving the information settings from the user devices 36 of the group managers 28, and/or other considerations. The group managers 28 may enter and/or select the information settings on their respective user devices 36. The settings component 18 may thereafter obtain the information settings. Implementations describing a manner in which the group managers 28 enter and/or select the information settings into their respective user devices are provided in more detail herein with later reference to FIG. 3.

The information settings for the individual groups 26 may correspond to the information which the group managers 28 wish to receive from the user devices 36 of the members 30 of the associated groups 26 for each instance information is shared, and/or other considerations. The information received by the group managers 28 may correspond to information which is captured and sent from the user devices 36 associated with the members 30 of a group to the server 12 (e.g., to the implementation component 20 described shortly below), and then communicated from the server 12 to the user devices 36 of the group managers 28.

Information settings selected by the group managers 28 may comprise entry and/or selection of one or more of information type, size, and/or the time/date related to the information that they wish to receive from the user devices 36 of members 30 of the associated user groups 26, and/or other considerations. Group manager selections may be accomplished by the group managers 28 employing a suitable interface presented on their respective user devices 36 which is capable of receiving such entry and/or selection. For example, the user devices 36 of the group managers may be configured to effectuate presentation of a user interface on the user devices 36 of the group managers 28. The user interface may be configured such that the group managers 28 may select check boxes, items from a list, and/or other technique for providing selections of the desired information settings. Group managers 28 may make selection of information settings by other techniques and/or methods.

Settings component 18 may obtain the information settings from the group managers 28 in a variety of ways. In some implementations, the entry and/or selection of information setting may be saved directly to the server 12 (e.g., in storage 24). In some implementations, the entry and/or selection of information setting may be saved locally at the user devices 36 associated with the group managers 28. The user devices 36 may be configured to effectuate transmission of the locally saved information settings from the respective user device 36 to the server 12 through a communication channel (e.g., network 38). Settings component 18 may obtain the information settings selected by the group managers 28 by other techniques.

For example, referring to FIG. 2A and FIG. 2B, the information settings obtained by settings component 18 may include first information settings 42 for the first group 32 selected by the first group manager (e.g., user associated with the third user device 35). The first information settings may correspond to one or more of the type of information, size of data files of information which can be shared, the time/date at which information may be shared, and/or other information as described herein. For example, following the previous teacher/student example, the teacher may make an information settings selection which defines the sharing of information only during class times and/or times when homework related information is due, and/or other considerations. Information which is shared may include information associated with a first information set 44. The first information set 44 may include information that is received (by the implementation component 20) from the first member (e.g., user of first user device 31), the second member (e.g., user of second user device 33), and/or other members associated with the first group 32, and/or other information.

In some implementations, referring back to FIG. 1, the implementation component 20 may be configured to implement the information settings. Implementing the information settings may include effectuating a capture of information at the user devices 36 of the members 30. The implementation component 20 may be configured to receive the information which is captured on user devices 36 of the members 30 associated with the user groups 26. A manner in which group managers 28 direct the members 30 to initiate capture information on their respective user devices 36, and/or information is automatically captured, and/or a manner in which the information is sent to the implementation component 20, is described in more detail with later reference to FIG. 3.

In some implementations, the information settings selected by the group managers 28 may only be viewable and/or perceptible on user devices 36 associated with the group managers 28. For example, during implementation of the information settings, the group members 30 may ambiguously capture and/or send omnibus information to the sever 12. The implementation component 20 may be configured to implement the information settings to obtain exclusive information from the omnibus (e.g., non-exclusive) information. The exclusive information may then be shared with the group managers 28 (e.g., communicated from the server 12 to the user devices of the group managers 28). The processes of the implementation component 20, described in more detail herein, may be imperceptible by the group members 30 (e.g., group members 30 are unaware of the processes of the implementation component 20). Other techniques in which information is shared are described in more detail herein.

Figure 4:
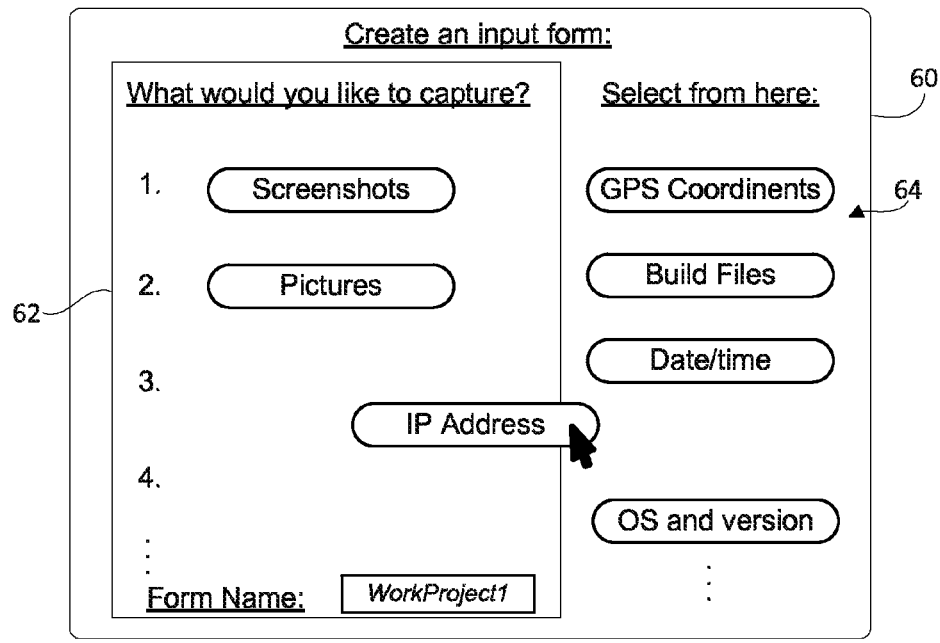
FIG. 4 illustrates an implementation of a user interface presented to group managers to create and/or select custom information capture forms.

In some implementation, the group managers 28 may create customizable input templates, input forms, "blanks", and/or software interfaces of which the group members 30 can use to selectively capture, input, and/or specify the certain information for sharing (see, e.g., FIG. 4). The group managers 28 may create and/or customize such data input forms on their respective user devices 36, and/or send the interfaces for display and/or user interaction on the user device 26 of the group members 30 for each instance of sharing. For example, the system 10 may be configured such that a given group manager 28 may design a data input form that consists of text fields, dropdown boxes, checkboxes, "drag and drop" fields, and/or other input considerations relating to the information the group managers 28 desire to receive. The customized form may be communicated to the user devices 36 of the group members 30 (directly or indirectly) such that the group members 30 can use the custom form for making the selections of the information to share.

Once the implementation component 20 receives the captured information, the implementation component 20 may be configured to transmit all and/or a subset of the received information to user devices 36 of the group managers 28 associated with the user groups 26. The group managers 28 may view the aggregate information received from the server 12 corresponding to one or all associated group members 30 via a display (e.g., visual display screen) on their respective user devices 36.

In some implementations, the implementation component 20 may be configured such that information that is captured from user devices 36 of the members 30 and received by the implementation component 20 comprises non-exclusive information. Non-exclusive information may be non-exclusive information as described previously herein (e.g., omnibus information independent on information settings), and/or other information. The implementation component 20 may receive the captured non-exclusive information. The implementation component 20 may be configured to filter through the non-exclusive information to obtain exclusive information (e.g., information that is in accordance with the information settings). The implementation component 20 may be configured to effectuate transmission of only the exclusive information to the user devices 36 of the group managers 28.

In some implementations, the implementation component 20 may be configured such that the information that is captured from user devices 36 of the members 30 and thereafter received by the implementation component 20 comprises only the exclusive information. Exclusive information may be information corresponding exclusively to the information settings (e.g., only the information related to the selections of the information settings). For example, the user device 36 of the members 30 may be configured to only capture such exclusive information, and/or other considerations. In some implementations, the implementation component 20 receives the captured exclusive information, and transmits the exclusive information to the user devices 36 of the group managers 28 (e.g., with or without further filtering).

As an illustrative example in FIG. 2A, in some implementations the implementation component 20 may be configured to receive the first information set 44. The first information set may include information captured on, and sent to the sever 12 (e.g., implementation component 20) from the first user device 31, the second user device 33, and/or other user devices and/or may include other information. The implementation component 20 may transmit the received first information set 44, or a subset of the first information set, to the third user device 35 associated with the first group manager.

In some implementations, the received first information set 44 may comprise first non-exclusive information 45. The first non-exclusive information 45 may include non-exclusive information that is captured on and sent from the first user device 31, second user device 32, and/or other user devices. The implementation component 20 may be configured to, however, effectuate transmission of a subset of the first information 44 comprising only first exclusive information 47 to the third user device 35 for sharing with the first group manager. The first exclusive information 47 may be a subset of the first non-exclusive information 45 that is determined based on the first information settings 42. In some implementations, obtaining the first exclusive information 47 may comprise filtering 46, by the implementation component 20, the received first non-exclusive information 45 for the first exclusive information 47 based on the selections associated with the first information settings 42.

As another illustrative example in FIG. 2B, the received first information set 44 may comprise the first exclusive information 47 and/or other information. The first exclusive information 45 may include exclusive information that is captured on and sent from the first user device 31, second user device 32, and/or other user devices. The implementation component 20 may be configured to effectuate transmission of the first exclusive information 47 to the third user device 35 for sharing with the first group manager (e.g., without filtering).

In some implementations, the implementation component 20 may be configured such that receiving only the first exclusive information 47 from the first user device 31, second user device 33, and/or other user devices is accomplished by virtue of only exclusive information being captured at the respective devices based on the first information settings 42. For example, the server 12 (e.g., settings component 18) may communicate the first information settings 42 (e.g., received from the first group manager) to the first user device 31, the second user device 33 (and/or other user devices 36 within the first group 32) such that the user devices 31, 33 are capable of determining the exclusivity of the information which should be captured. In some implementations, communicating the received first information settings 42 to the user devices 31, 33, may be imperceptible by the first member, second member, and/or other members. For example, the members may be unaware that only exclusive information is being captured when they share information. In some implementations, communicating the received first information settings 42 to the user devices may be perceptible by the members such that they are aware that only exclusive information is being captured for sharing.

Figure 3:
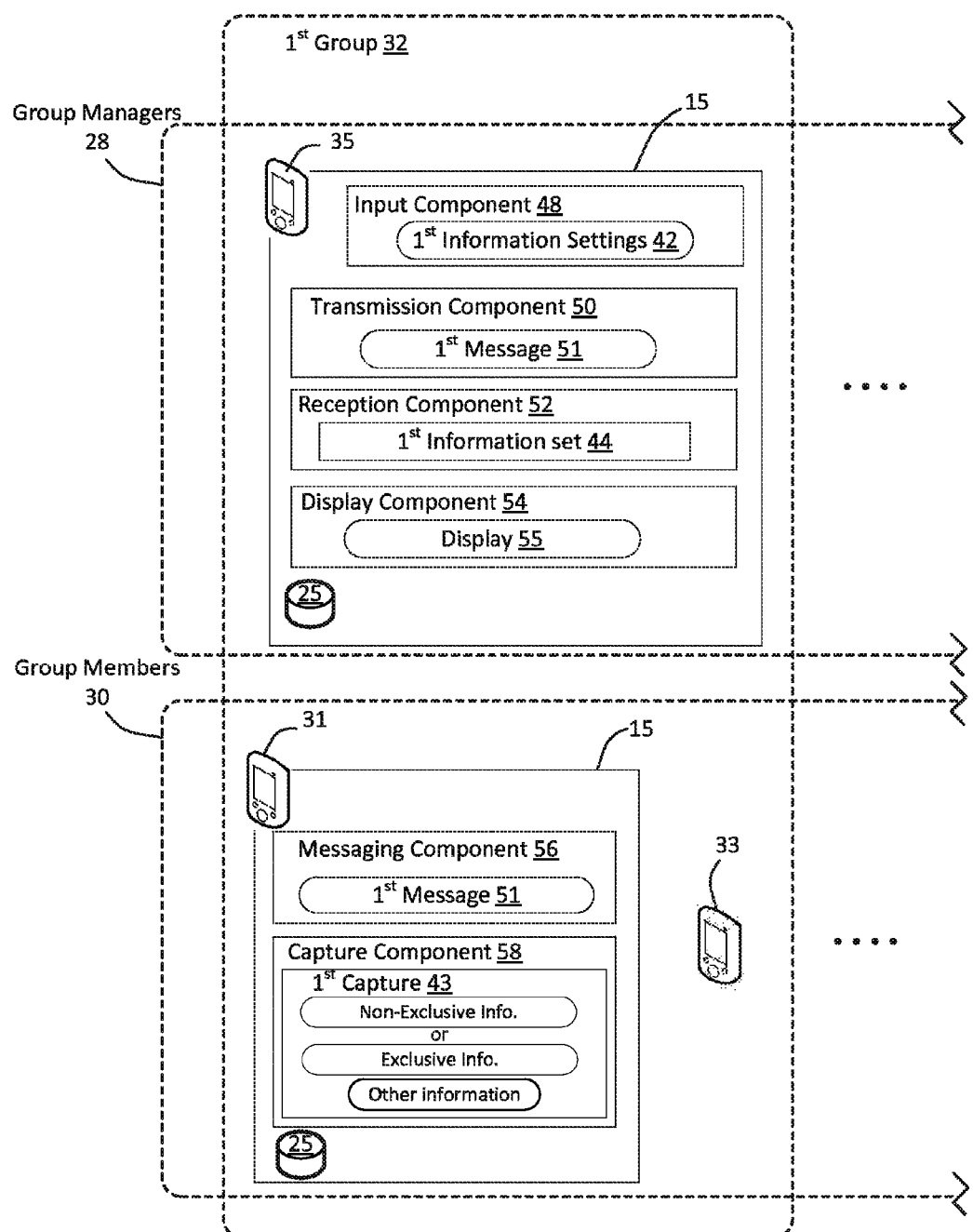
FIG. 3 illustrates an implementation of a user group of the system of FIG. 1 comprising user devices associated with a group manager and user devices associated with group members.

FIG. 3 shows, without implying limitations, an illustrative example depicting the execution of computer components by the user devices associated with group managers 28 and group members 30. In particular, reference is made to the first group 32 comprising the first user device 31 associated with the first member, the second user device 33 associated with the second member, and third user device 35 associated with the first group manager.

It is noted that although FIG. 1 and FIG. 3 specifically depict processor 15 and computer components 48, 50, 52, and 54 for the third user device 35 associated with the first group manager of a first user group 32, it is to be understood that the features and descriptions directed thereto may be similarly carried out by any user devices 36 associated with group managers 28 of any of the user group 26, and therefore should not be considered limited by the depiction.

Further, it is additionally noted that although FIG. 1 and FIG. 3 currently depicts processor 15 and computer components 56 and 58 included in the first user device 31, it is to be understood that the features and descriptions directed thereto may be similarly carried out by any and all user devices 36 associated with any and/or all group members 30 of any and/or all of the user groups 26 (e.g., including second user device 33 associated with the second member of the first user group 32, and/or other user devices associated with other group members 30), and therefore should not be considered limited by the depiction.

With that being said, in FIG. 3, the input component 48 may be configured to obtain information settings input from the group managers 28. Obtaining the information settings may be based at least in part on entry and/or selection of information settings by the group managers. For example, the input component 48 may be configured to obtain the first information settings 42 based on entry and/or selection by the first group manager. The first information settings 42 may then be obtained by the settings component 18 of the server 12 of FIG. 1 by any of the techniques as described previously herein (see, e.g., inter alia descriptions for FIGS. 1, 2A, and/or 2B), and/or other considerations.

The transmission component 50 may be configured to effectuate transmission, to the user devices associated with the members 30 of a given user group, of a message directing the members to capture and/or send (e.g., share) information to the group manager. For example, the transmission component 50 may be configured to effectuation transmission, to the first user device 31, the second user device 33, and/or other user devices associated with members of the first user group 32, a first message 51 directing the first member and/or the second member (e.g., and/or other members of the first group 32) to capture and/or send (e.g., share) information to the first group manager (e.g., user of the third user device 35). The transmission component 50 may be configured to initiate capture and/or sharing of information by the members by other techniques.

The reception component 52 may be configured to, responsive to the members 30 sending information to the group managers 28 (e.g., directly or indirectly) as directed by the message transmitted via the transmission component 50, receive information from the members 30 of the user groups 26 associated with the group managers. The information received may be in accordance to the information settings obtained by the input component 48 (and communicated to the settings component 18 in FIG. 1). The information may be received by the user devices 36 of the group managers 28 by techniques described previously herein (see, e.g., inter alia, descriptions for FIGS. 1, 2A, and/or 2B). For example, responsive to the first member and/or second member capturing and/or sending information as directed by the first message 51, the reception component 52 receives the first information set 44 that comprises some or all of the information captured and/or sent from the first user device 31 and/or the second user device 33. The third user device 35 (e.g., reception component 52) may be configured to receive the first information set 44 and/or a subset of the first information set 44 as described previously herein (see, e.g., inter alia, descriptions for FIG. 2A and/or FIG. 2B).

The display component 54 may be configured to display the information received by the reception component 52 on the user devices 36 of the group managers 28. The information may be displayed on the user devices 36 by techniques previously described herein (see, e.g., inter alia, descriptions for FIG. 1). The display component 54 may effectuate presentation of user identification information along with the shared information. Again, the user identification information may facilitate organizing and/or listing the received information with respect to the sender, thereby allowing the group manager viewing the displayed information to correlate the displayed share information with the appropriate members, as described previously herein (see, e.g., inter alia, descriptions for FIG. 1). For example, the display component may be configured to effectuate a display 55 of the first information set 44, or a subset of the first information set 44, user identification information associated therewith, and/or other information.

In some implementations, the display component 54 may be configured to extract text and/or other data (e.g., metadata) from images shared and displayed on the user devices 36 of the group managers 28. For example, text extraction from images containing text and/or other data may be accomplished via optical character recognition (OCR), and/or other techniques. This may allow the system 10 to automate the extraction of data (e.g., text) from the captured images. In some implementations, the display component 54 may be additionally configured to compile and present the extracted data on one or more charts, graphs, figures, and/or other suitable display graphics providing an organized view that allows the group mangers to visualize the data once extracted.

Figure 5:
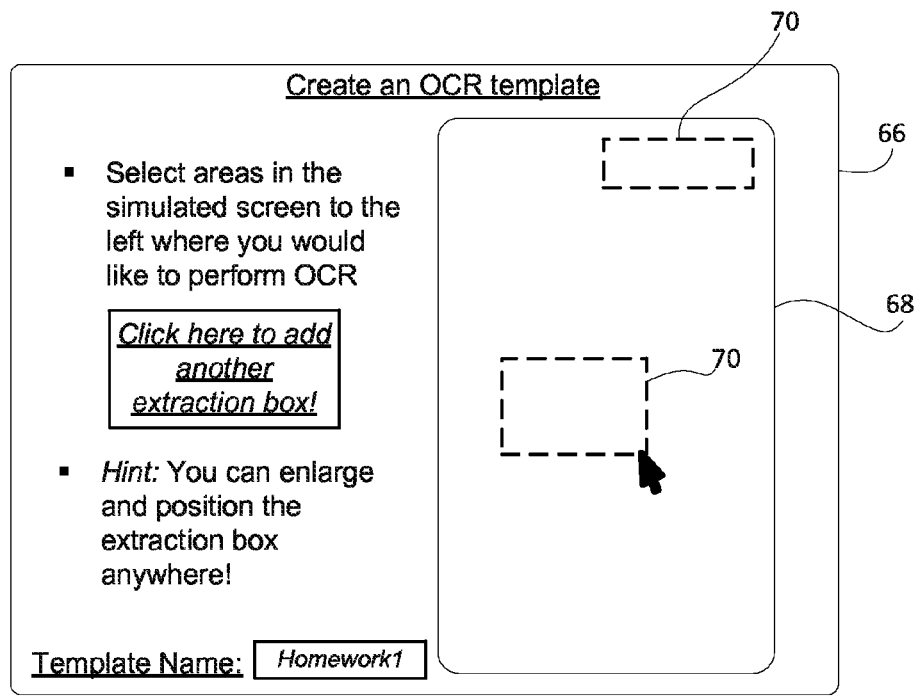
FIG. 5 illustrates an implementation of a user interface presented to group managers to create and/or selection custom OCR templates.

In some implementations, the user devices 36 may be configured such that managers 28 and/or members 30 customize image-specific OCR templates (see, e.g., FIG. 5). Such templates may be configured to identify and extract key data (e.g., text) from images sent to the group managers 28 (e.g., images including text portions desired to be extracted which always appear in the same location of the image). In some implementations, the system 10 may be configured to facilitate sharing of these customized templates between group managers 28 of the system 10 (e.g., crowd-sourcing of the OCR templates). The templates may be made available for access by group manages 28 via a database of such templates stored by the server 12, an external resource, and/or other considerations.

Referring now to the user devices 36 of the group members 30, the messaging component 56 may be configured to receive messages which are sent (either directly or indirectly) from user devices 36 of the group manager 28. The messages may be messages directing the group member 30 to send information to the group managers 28 as described previously herein. For example, the messaging component 56 may be configured to receive the first message 51 sent from the third user device 35 (e.g., first group manager of the first group 32, either directly or indirectly). The messaging component 56 may be configured such that messages are received via communication channels which are internal or external to the system 10. For example, messages may be communicated via one or more of the network 38, an SMS message, electronic mail, voice message, a telephone call, communications routed to and/or from the server, and/or other communication channel which is internal and/or external to the system 10.

The capture component 58 may be configured to, responsive to the members 30 positively responding to the messages received by the messaging component 56, capture information from the user devices 36 of the member 30. The captured information may correspond to selections of information settings by the group manager in manner which captured information is exclusive to the information settings, and/or non-exclusive to the information settings as described previously herein (see, e.g., inter alia, description for FIG. 1, FIG. 2A and/or FIG. 2B).

Responsive to capturing the information, the capture component 58 may be configured to send the information to a remote server (e.g., server 12 in FIG. 1). The remote server may receive the captured and sent information via techniques described previously herein (see, e.g., inter alia, description for FIG. 1). As an illustrative example, responsive to the first member positively responding to the first message 51 received by the messaging component 56, the capture component 58 may be configured to perform a first capture 43 of information at the first user device 31. The first capture 43 may include non-exclusive information, exclusive information, and/or other information. Responsive to capturing the information included in the first capture 43, the capture component 58 may be configured to send the information included in the first capture 43 to the remote server.

In some implementations, the capture component 58 may be configured such that members positively responding to the messages received by the messaging component comprises effectuating, by the messaging component 56, the presentation of a user interface on the user devices 36 of the members 30. The user interface may be configured to receive an input response from the members 30 for responding to the message (see, e.g., FIG. 6). In some implementations, the user interface comprises at least a selectable send button, and/or other considerations. The selectable send button may include a graphical representation of a button presented on the user devices 36. The user devices 36 may be configured to receive user entry and/or selection of the simulated button (e.g., via a keyed input, touchscreen input, voice input, gesture input, and/or other consideration).

In some implementations, the capture component 58 may be configured such that the capturing information from the user devices 36 and the sending information from the user devices 36 to the remote server occur at the same time (e.g., at the instant the user selects the send button). In some implementations, capturing information and sending information may be accomplished in separate steps.

In some implementations, the capture component 58 may be configured such that capturing information may include employing a group manager-customized input form as described previously. For example, FIG. 4 illustrates an implementation of a first user interface 60 presented on user devices of group managers. The first user interface 60 may be used to create and/or select customized input forms, such as form 62. In some implementations, the first user interface 60 may be configured to receive user entry and/or selection for selecting various information settings to include in the the form 62. For example, the user select from a plurality of icons 64 representing the information types, size, and/or date and/or time related to the information they wish to be shared. The user may "drag and drop" the desired icons corresponding to the desired information settings they wish to implement. It is noted that the depiction of a "drag and drop" technique for user entry is provided merely for illustrative purposes. For example, in other implementations, the first user interface 60 may be configured for other entry and/or selection techniques (e.g., check boxes, drop down boxes, and/or other technique). The group mangers may name their customized form for saving on the server and/or user device.

FIG. 5 illustrates an implementation of a second user interface 66 configured for presentation on the user devices of the group managers. The second user interface 66 may be configured to receive user entry and/or selection for creating and/or selection custom OCR templates. The second user interface 66 may include instructions for creating such templates. For example, the second user interface 66 may include a simulated screen 68 that provides the basis for the template. The simulated screen 68 may represent a size, shape, and/or dimension of a typical screen shot taken on a user device (e.g., a smartphone, tablet, PC, laptop, and/or other device). The second user interface 66 may be configured to receive user entry and/or selection of selection particular areas on the simulated screen 68 that correspond to one or more particular areas that the group manager may want to focus character recognition on. For example, if the group manager wants the member to share screen shots of a particular document (and/or other information), and the document includes information of importance located in the upper right corner (or other location) which is to be extracted, then the group manager may select an area in the upper right corner of the simulated screen 68. As such, when the group manager receives multiple screenshots from members, the template may facilitate extracting the desired information in an efficient manner (e.g., an OCR process may or may not be carried out in the entire area of the screen). Selection of areas of the simulated screen 68 may be facilitated by selectable extraction boxes 70 which the user may selectively position and/or resize as desired on the simulated screen 68, and/or other considerations. The template may be named and/or saved by the group manager for later use.

Figure 6:
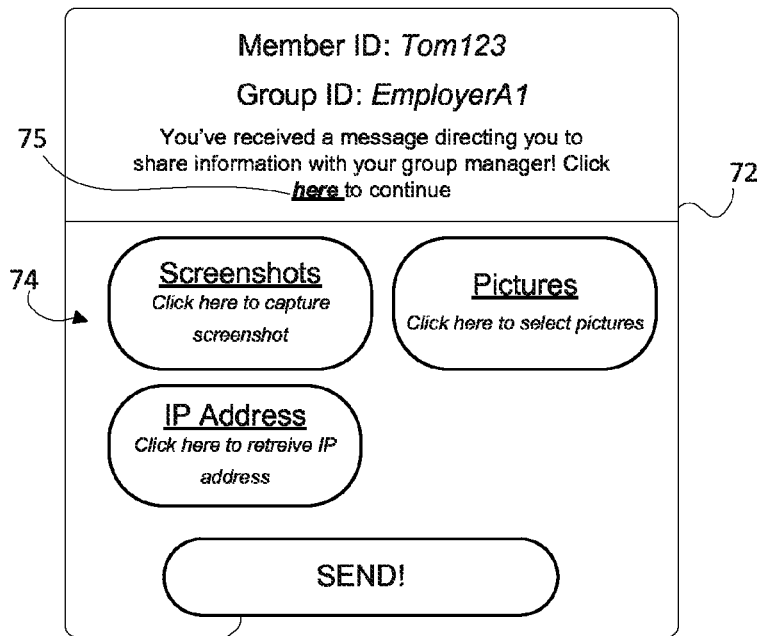
FIG. 6 illustrates an implementation of a user interface presented to group members used for capturing selective information at their respective user devices.

FIG. 6 illustrates an implementation of a third user interface 72 configured for presentation on the user devices of the group members. The third user interface 72 may be configured to receive user entry and/or selection of information that is to be captured and/or shared with an associated group manager. For example, the third user interface 72 may be presented to the members after the members have positively responded to a message directing them to capture and/or send information. In some implementations, the third user interface 72 may include the message and/or a representation of the message depicted on the interface. The third user interface 72 may include a selectable interface element 75, which upon selection results in a positive response by the member to the message, such that sharing of information may proceed. In some implementations, the message and/or selectable interface element 75 may be provided in a separate user interface (not shown).

In some implementations, the third user interface 72 may include one or more other selectable elements, buttons, and/or icons 74, which direct the user in selectively capturing information for sharing. In some implementations, the icons 74 may be unelectable until the user has positively responded to a message (e.g., selection of interface element 75), and/or other considerations. The icons 74 may correspond to the selections made by a group manager using a user interface the same or similar to the first user interface 60 (FIG. 4). Individual selection of the icons 74 may facilitate capturing and/or retrieving the associated information (e.g., direct the user to selecting photos to share, capturing screenshots, retrieving device information, and/or other considerations). Once information is captured, the third user interface 76 may be configured to receive user entry and/or selection of a confirmation to "send" the information (e.g., via a "send" interface element 76). In some implementations, the third user interface 72 may present a review of the information prior to actually sending the information (e.g., requiring additional entry and/or selection from the member to finalize sending the information).

In some implementations, the third user interface 72 employed for receiving user entry and/or selection for capturing and/or sending information may include only the send interface element 76. In this manner, the members may or may not have to selectively capture each item of information such that the selection of the sent interface element 76 effectuates the capture as well as the transmission. The capture may correspond to either exclusive information and/or non-exclusive information as described herein.

Figure 7:
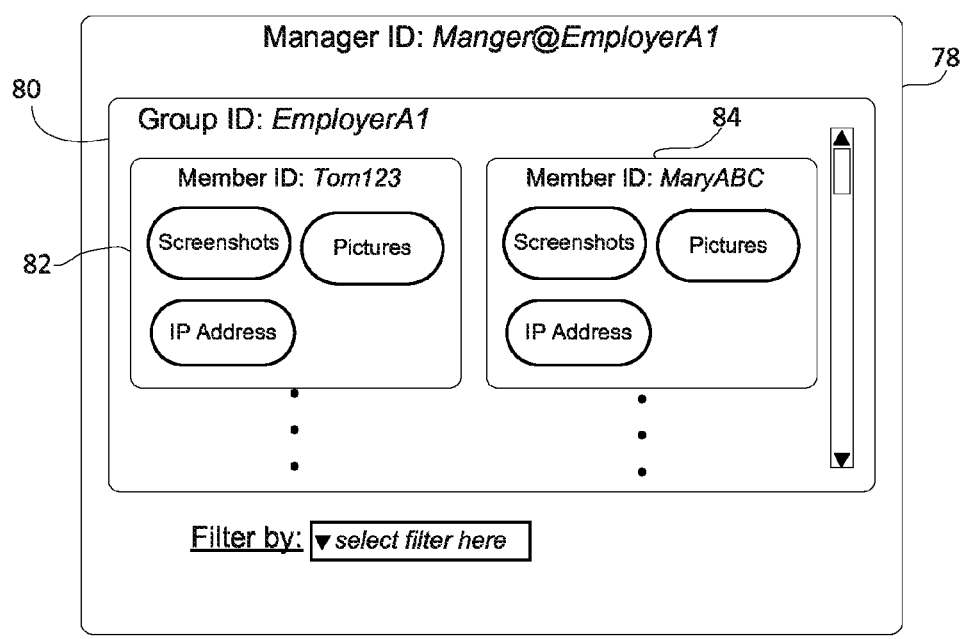
FIG. 7 illustrates an implementation of a user interface presented to group managers providing an organized aggregate of information collected from multiple group members.

FIG. 7 illustrates an implementation of a fourth user interface 78 configured for presentation on the user devices of the group managers. The fourth user interface 78 may be configured to effectuate presentation of information that is received from the members associated with the group manager. For example, the fourth user interface 78 may include one or more group-specific portions 80 which display information received by the associated members 82, 84 (and/or other members) of a particular group managed by the group manager. The portion 80 may display an organized aggregate of the information that is collected from the multiple group members. The fourth user interface 78 may be configured to receive user entry and/or selection for filtering, searching, organizing, sorting, scrolling through, and/or otherwise viewing selective information (e.g., based on member identification, information type, reception date, tags, and/or other considerations).

In some implementation, the fourth user interface 78 may include other features and/or components that may facilitate organization of information. For example, the fourth user interface 78 may include components related to the activity history of the group manager (e.g., activity log), the activity histories of the members, help menus, and/or other considerations.

The depictions and/or accompanying descriptions of the user interfaces shown in FIGS. 4-7 are intended for illustrative purposes only and are not intended to be limiting. For example, in some implementations, the formatting structure, various components, and/or other elements of the user interfaces may be changed, modified, and/or additional features may be added in accordance with one or more implementations of the system 10 presented herein.

Returning to FIG. 1, the server 12, user devices 36, and/or external resources 40 may be operatively linked via one or more electronic communication links. For example, such electronic communication links may be established, at least in part, via network 38 such as the Internet and/or other networks, such as near field communication, Bluetooth®, and/or wifi. It will be appreciated that this is not intended to be limiting, and that the scope of this disclosure includes implementations in which servers 12, user devices 36, and/or external resources 40 may be operatively linked via some other communication media.

The external resources 40 may include sources of information, hosts and/or providers of virtual environments outside of system 10, external entities participating with system 10 (e.g., cloud storage), and/or other resources. In some implementations, some or all of the functionality attributed herein to external resources 40 may be provided by resources included in system 10.

The server 12 and user devices 36 may include electronic storage 24, 25, respectively, one or more processors 14, 15 respectively and/or other components. The server 12 and/or user devices 36 may include communication lines, or ports to enable the exchange of information with a network and/or other computing platforms. Illustration of server 12 and user devices 36 in FIG. 1 are not intended to be limiting. The server 12 and user devices 36 may include a plurality of hardware, software, and/or firmware components operating together to provide the functionality attributed herein to the server 12 and user devices 36 respectively. For example, server 12 may be implemented by a cloud of computing platforms operating together as server 12.

Electronic storage 24, 25 may comprise electronic storage media that electronically stores information. The electronic storage media of electronic storage 24, 25 may include one or both of system storage that is provided integrally (i.e., substantially non-removable) with server 12 and user devices 36, respectively, and/or removable storage that is removably connectable to server 12 and user devices 36 respectively, via, for example, a port (e.g., a USB port, a firewire port, etc.) or a drive (e.g., a disk drive, etc.). Electronic storage 24, 25 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storage 24, 25 may include one or more virtual storage resources (e.g., cloud storage, a virtual private network, and/or other virtual storage resources). Electronic storage 24, 25 may store software algorithms, information determined by processors 14, 15, respectively, information received from server 12, information received from user devices 36, and/or other information that enables server 12 and user devices 36 to function as described herein.

Processor(s) 14, 15 are configured to provide information processing capabilities in server 12 and user devices 36, respectively. As such, processors 14, 15 may include one or more of a digital processor, an analog processor, a digital circuit designed to process information, an analog circuit designed to process information, a state machine, and/or other mechanisms for electronically processing information. Although processors 14 and 15 are shown in FIG. 1 as respective single entities, this is for illustrative purposes only. In some implementations, processor 14 and/or 15 may include one or more processing units. These respective processing units may be physically located within the same device, or processor 14 and/or 15 may represent processing functionality of a plurality of devices operating in coordination. The processor 14 may be configured to execute components 16, 18, 20. Processor 14 may be configured to execute components 16, 18, 20 by software; hardware; firmware; some combination of software, hardware, and/or firmware; and/or other mechanisms for configuring processing capabilities on processor 14. The processors 15 may be configured to execute components 48, 50, 52, 54 and/or 56, 58. Processor 15 may be configured to execute components 48, 50, 52, 54 and/or 56, 58 by software; hardware; firmware; some combination of software, hardware, and/or firmware; and/or other mechanisms for configuring processing capabilities on processor 15.

It should be appreciated that although components 16, 18, 20, and 48, 50, 52, 54 and 56, 58 are illustrated in FIG. 1 as being co-located within respective single processing units, in implementations in which processor 14 and/or 15 include multiple processing units, one or more of components 16, 18, 20, and/or 48, 50, 52, 54 and/or 56, 58 may be located remotely from the other components. The description of the functionality provided by the different components 16, 18, 20, and/or 48, 50, 52, 54 and/or 56, 58 described above is for illustrative purposes and is not intended to be limiting, as any of components 16, 18, 20, and/or 48, 50, 52, 54 and/or 56, 58 may provide more or less functionality than is described. For example, one or more of components 16, 18, and/or 20 may be eliminated, and some or all of its functionality may be provided by other ones of components 16, 18, 20, and/or other components. As another example, processor 14 may be configured to execute one or more additional components that may perform some or all of the functionality attributed below to one of components 16, 18, 20.

Figure 8:
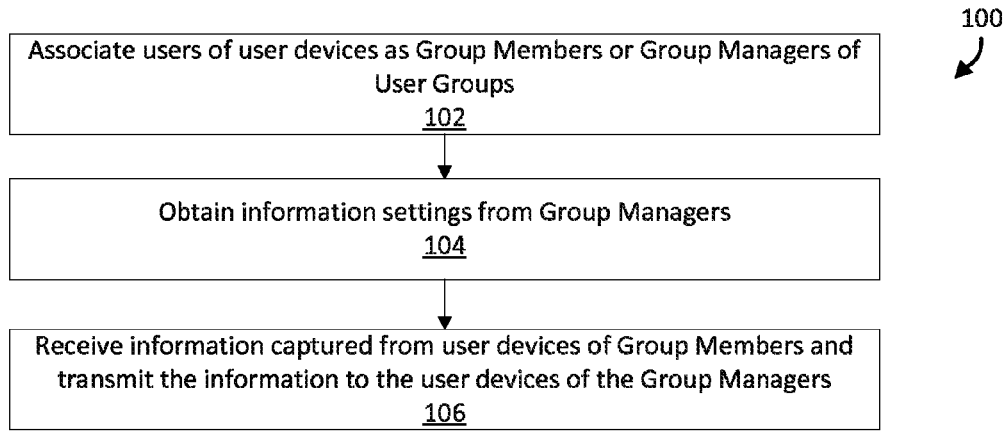
FIG. 8 illustrates an implementation of a method of processing information which is shared between user devices in a many-to-one manner.
Figure 9:
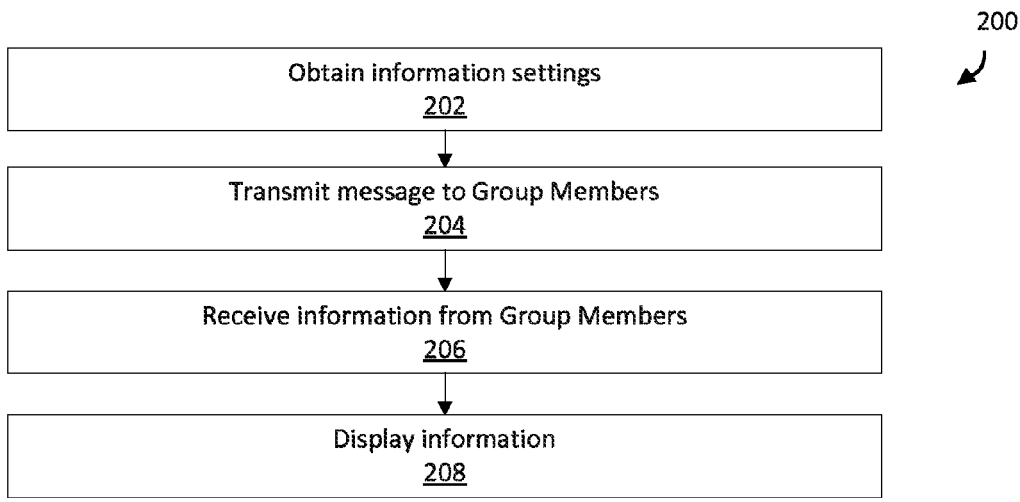
FIG. 9 illustrates an implementation of method of sharing information between a user device of a group manager and user devices of group members.
Figure 10:
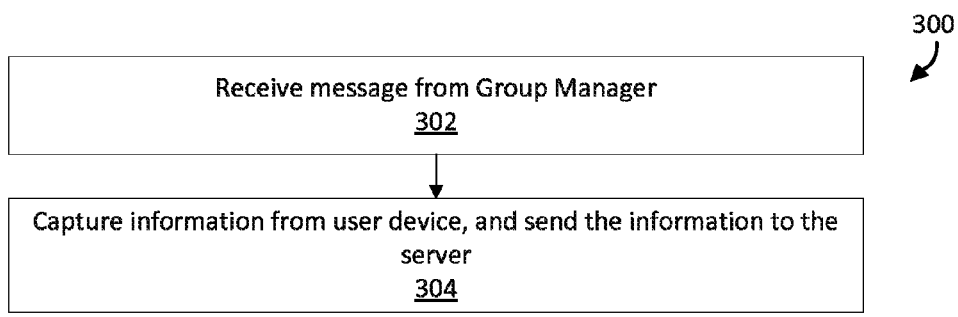
FIG. 10 illustrates an implementation of a method of sharing information between a user device of a group member and a user device of a group manager.

FIG. 8, FIG. 9, and FIG. 10 depict methods 100, 200, and 300, respectively, related to communicating information between media devices in a many-to-one manner. The operations of the methods 100, 200, and/or 300 described here presented below are intended to be illustrative. In some implementations, the methods 100, 200, and/or 300 may be accomplished with one or more additional operations not described, and/or without one or more of the operations discussed. Additionally, the order in which the operations of the methods described below are not intended to be limiting.

In some implementations, the methods 100, 200, and/or 300 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of methods 100, 200, and/or 300 in response to instructions stored electronically on an electronic storage medium. The one or more processing devices may include one or more devices configured through hardware, firmware, and/or software to be specifically designed for execution of one or more of the operations of methods 100, 200, and/or 300.

Referring now to a method 100 in FIG. 8 of processing and/or organization information communicated between media devices, at an operation 102, users of user devices may be associated with individual user groups. The associations may include associating group manager type users as managers of the individual user groups and group members type users as members of the individual user. In some implementations, operation 102 may be performed by a grouping component the same as, or similar to, grouping component 16 (shown in FIG. 1 and described herein).

At an operation 104, information settings for individual user groups related to the information shared between users in the group may be obtained. The information settings for the individual groups may correspond to information that is to be received by user devices of the group managers from user devices of the members associated with the user groups. In some implementations, operation 104 may be performed by a settings component the same as or similar to the settings component 18 (shown in FIG. 1 and described herein).

At an operation 106, information which is captured on user devices of the member associated with the user groups may be received. The received information and/or other information may be transmitted to user devices of the group managers associated with the user groups. Information which is received may be exclusive or non-exclusive to the information settings. The information which is transmitted may be exclusive to the information settings based on the implementation of the information settings. In some implementations, operation 106 may be performed by an implementation component the same as or similar to implementation component 20 (shown in FIG. 1 and described herein).

Referring now to method 200 in FIG. 9 for communicating information between a group manager user device and user devices of members of the group managed by the group manager, at an operation 202, information settings for an individual user group may be obtained on the user devices of the group manager. Obtaining the information settings may include the group manager inputting entry and/or selections of information settings on their user device. In some implementations, operation 202 may be performed by an input component the same as or similar to input component 48 (shown in FIG. 1 and described herein).

At an operation 204, a message may be transmitted from the user device of the group manager to the user devices associated with the members of the individual user group, either directly or indirectly. The message may direct the members to capture and/or send information to the group manager. In some implementations, this operation may be performed by a transmission component the same as, or similar to, the transmission component 50 (shown in FIG. 1 and described herein).

At an operation 206, responsive to the members capturing and/or sending information to the group manager as directed by the message, the user devices of the group managers may receive information from the members of the user group. The information received may be in accordance to the information settings. In some implementations, operation 206 may be performed by a reception component the same as or similar to reception component 52 (shown in FIG. 1 and described herein).

At an operation 208, the information received by the user device of the group manager may be displayed on the user device of the group manager. In some implementations, operation 208 may be performed by a display component the same as or similar to display component 54 (shown in FIG. 1 and described herein).

Referring now to method 300 in FIG. 10 of communicating information between a group member user device and a user device of manager of a user group, at an operation 302, messages sent from the user device of the group manager may be received. In some implementations, this operation may be performed by a messaging component the same as, or similar to, messaging component 56 (shown in FIG. 1 and described herein).

At an operation 304, responsive to the member positively responding to the message received by the previous operation, information may be captured on the user device of the member of individual user group. The captured information may correspond to selections of information settings by the group manager and/or other information. Responsive to capturing the information, the information may be sent to a remote server. In some implementations, operation 304 may be performed by a capture component the same as, or similar to, the capture component 58 (shown in FIG. 1 and described herein).

Although the present technology has been described in detail, for the purpose of illustration, based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

What is claimed is:

1. A system for processing information communicated between media devices, the system comprising:
one or more hardware processors configured by computer readable instructions to:
associate users with user groups, including associating group manager type users as group managers of individual user groups and group member type users as group members of the individual user groups, including associating a first group manager, a first member, and a second member with a first group;
obtain information settings for the individual user groups selected by the group managers of the individual user groups, a given information setting corresponding to information that members share with a group manager of an given user group, including obtaining first information settings for the first group entered and/or selected by the first group manager, the first information settings corresponding to information that the first member and the second member share with the first group manager;
receive information captured on user devices of the members, and effectuate transmission of information to user devices associated with group managers based on the information settings for the individual user groups, including receiving a first information set that includes information captured on a first user device associated with the first member and a second user device associated with the second member, and effectuating transmission of information included in the first information set to a third user device associated with the first group manager, wherein the information included in the first information set that is transmitted to the third user device is based on the first information settings.

2. The system of claim 1 wherein the one or more processors are configured by computer readable instructions such that effectuating transmission of the information to the user devices of the group manager facilitates presentation of the information on the user devices associated with the group managers in an aggregate, organized manner, such that effectuation transmission of the information included in the first information set based on the first information settings to the third user device facilitates presentation of the information included in the first information set on the third user device in an aggregate, organized manner.

3. The system of claim 1 wherein the one or more processors are configured by computer readable instructions such that obtaining information settings selected by the group managers comprises receiving entry and/or selection by the group managers of one or more of an information type, a size, or a time/date related to the sharing of information between members and a group manager of a given user group, such that obtaining the first information settings entered and/or selected by the first group manager comprises receiving entry and/or selection by the first group manager of one or more of a first information type, a first size, or a first time/date related to the sharing of information from the first member and the second member to the first group manager.

4. The system of claim 3 wherein the one or more processors are configured by computer readable instructions such that information type comprises one or more of user device information, images, or user identification information.

5. The system of claim 4 wherein the one or more processors are configured by computer readable instructions such that user device information comprises one or more of geo-location coordinates, operating system version, user device manufacturer, user device model, user device IP address, user device MAC address, or user device build files.

6. The system of claim 4 wherein the one or more processors are configured by computer readable instructions such that images include screenshots.

7. The system of claim 4 wherein the one or more processors are configured by computer readable instructions such that user identification information comprises one or more of a user identification number or a username.

8. The system of claim 1 wherein the one or more processors are configured by computer readable instructions such that information settings selected by the group managers are only viewable by the group managers.

9. The system of claim 1 wherein the one or more processors are configured by computer readable instructions such that obtaining information settings entered and/or selected by the group managers further comprises effectuating presentation, on the user devices of the group managers, of a user interface configured to receive entry and/or selection of the information settings.

10. The system of claim 1 wherein the one or more processors are configured by computer readable instructions such that user devices comprise one or more of a smartphone, a PDA, a smart TV, a laptop computer a tablet computer, a wearable computing device, or a desktop computer.

11. The system of claim 1 wherein the one or more processors are configured by computer readable instructions such that user groups are assigned group identification information.

12. The system of claim 1 wherein the grouping component is further configured such that members associated with user groups are assigned user identification information.

13. The system of claim 1 wherein the one or more processors are configured by computer readable instructions such that the information that is captured from the user devices of the members comprises non-exclusive information, such that receiving information comprises receiving the captured non-exclusive information, and effectuation transmission of information includes effectuation transmission of exclusive information, the exclusive information being a subset of the non-exclusive information, wherein the exclusive information corresponds to the information settings, such that the first information set includes first non-exclusive information comprising non-exclusive information captured from the first user device and non-exclusive information captured from the second user device, and wherein effectuating transmission of information includes effectuating transmission of first exclusive information that is included in the first information set, wherein the first exclusive information includes information that corresponds to the first information settings.

14. The system of claim 1 wherein the one or more processors are configured by computer readable instructions, such that the information that is captured from the user devices of the members comprises exclusive information, such that receiving information comprises receiving the captured exclusive information, and effectuating transmission of information includes effectuating transmission of the exclusive information, wherein the exclusive information corresponds to the information settings, such that the first information set includes exclusive information captured from the first user device and exclusive information captured from the second user device, and wherein effectuating transmission of information includes effectuating transmission of the first information set, wherein the first information set only includes information that corresponds to the first information settings.

15. The system of claim 13 wherein the one or more processors are configured by computer readable instructions such that effectuating transmission of exclusive information comprises filtering the non-exclusive information for the exclusive information based on the information settings.

16. A system for communicating information between media devices comprising;
one or more hardware processors configured by computer readable instructions to:
obtain information settings from a group manager associated with a user group, the user group including group members as members of the user group, wherein obtaining the information settings is based on entry and/or selection of the information settings by the group manager, the information settings corresponding to information that members share with a group manager of a given user group, including obtaining first information settings from a first group manager of a first group, the first information settings corresponding to information that a first member and a second member share with the first group manager, the first member and second member being members of the first group;
effectuate transmission, to the user devices associated with the members of the user group, of a message directing the members to send information to the group manager, including effectuating transmission, to a first user device associated with the first user and a second user device associated with the second user, of a first message directing the first member and the second member to share information with the first group manager;
responsive to the members positively responding to the message, receive information from the user devices associated with the members of the user group, wherein the information received is in accordance to the information settings, including responsive to the first member and second member positively responding to the first message, receiving information included in a first information set, the first information set including information captured from the first user device and information captured from the second user device, wherein the received information included in the first information set corresponds with the first information settings; and
effectuate display of the received information, including effectuating display of the received information included in the first information set on third user device associated with the first group manager.

17. The system of claim 16 wherein the one or more processors are configured by computer readable instructions such that obtaining information settings selected by the group managers comprises receiving entry and/or selection by the group managers of one or more of an information type, a size, or a time/date related to the sharing of information between members and a group manager of a given user group, such that obtaining the first information settings entered and/or selected by the first group manager comprises receiving entry and/or selection by the first group manager of one or more of a first information type, a first size, or a first time/date related to the sharing of information from the first member and the second member to the first group manager.

18. The system of claim 17 wherein the one or more processors are configured by computer readable instructions such that information types comprise one or more of user device information, images, or user identification information.

19. The system of claim 18 wherein the one or more processors are configured by computer readable instructions such that user device information comprises one or more of geo-location coordinates, operating system version, user device manufacturer, user device model, user device IP address, user device MAC address, or user device build files.

20. The system of claim 17 wherein the one or more processors are configured by computer readable instructions such that receiving information from the user devices associated with the members of the user group is facilitated by communications routed to and/or from a remote server.

21. The system of claim 17 wherein the one or more processors are configured by computer readable instructions such that obtaining information settings based on entry and/or selection by the group manager further comprises effectuating presentation of a user interface on the user device of the group manager, wherein the user interface is configured to receive entry and/or selection of the information settings.

22. A system for communicating information between media devices comprising;
one or more hardware processors configured by computer readable instructions to:
receive messages from user devices of group managers associated with individual user groups, the messages directing group members associated with the individual user groups to share information with an associated group manager, including receiving a first message at a first user device associated with a first member and a second user device associated with a second member, the first member and the second member being associated with a first group, the first message being communicated from a first group manager associated with the first group, the first message directing the first member and the second member to share information with the first group manager; and capture information from the user devices, the captured information corresponding to entry and/or selection of information settings by the group manager, the information settings corresponding to information that the group members share with a group manager of a given user group, and effectuate transmission of the information to a remote server, such that responsive to the first member positively responding to the first message, capture information from the first user device and effectuate transmission of the captured information to the remote server.

23. The system of claim 22 wherein the one or more processors are configured by computer readable instructions such that the first message communicated from the first group manager one or more of an SMS, electronic mail, voice message, or a telephone call.

24. The system of claim 22 wherein the one or more processors are configured by computer readable instructions such that the first member positively responding to the first message comprises effectuating a presentation of a user interface on the first user device, wherein the user interface is configured to receive entry and/or selection from the first member for responding to the message.

25. The system of claim 24 wherein the one or more processors are configured by computer readable instructions such that the user interface comprises a selectable send button.

26. The system of claim 22 wherein the one or more processors are configured by computer readable instructions such that capturing information from the first user device and effectuating transmission of the information to the remote server occurs at the same time.

27. The system of claim 22 wherein the one or more processors are configured by computer readable instructions such that the information settings are imperceptible by the members.

* * * * *